United States Patent [19]

Beduchaud et al.

[11] 4,187,520
[45] Feb. 5, 1980

[54] FACSIMILE TRANSMISSION INSTALLATION IN PARTICULAR FOR COPYING FORMS

[75] Inventors: Michel Beduchaud, Palaiseau; Martin de Loye, Versailles, both of France

[73] Assignee: Compagnie Industrielle des Telecommunications Cit-Alcatel, Paris, France

[21] Appl. No.: 911,244

[22] Filed: May 31, 1978

[30] Foreign Application Priority Data

May 31, 1977 [FR] France ............... 77 16564

[51] Int. Cl.² ............................................. H04N 1/38
[52] U.S. Cl. .................................. 358/257; 358/258
[58] Field of Search ............... 358/256, 257, 258, 263, 358/280, 903, 260; 235/470

[56] References Cited

U.S. PATENT DOCUMENTS 3,678,180  7/1972  Bond ................................... 358/257
3,700,797  10/1972  Wernikoff ........................... 358/280
3,743,765  7/1973  Maier .................................. 358/260
3,995,106  11/1976  Wern et al. ......................... 358/257
4,064,389  12/1977  Patterson ........................... 358/256

Primary Examiner—Robert L. Griffin
Assistant Examiner—Joseph A. Orsino, Jr.
Attorney, Agent, or Firm—Sughrue, Rothwell, Mion, Zinn and Macpeak

[57] ABSTRACT

The present invention relates to a facsimile transmission installation adapted to allow rapid transmission of the contents of forms. In accordance with the invention, various types of blank forms are memorized and the transmission equipment includes a comparator connected to a memory and to an analysis circuit and allows the transmission of a facsimile signal which represents only the data added on the analyzed filled-in form and the reception equipment includes a text regenerator which operates from a transmitted facsimile signal and from a signal which comes from its memory.

7 Claims, 6 Drawing Figures

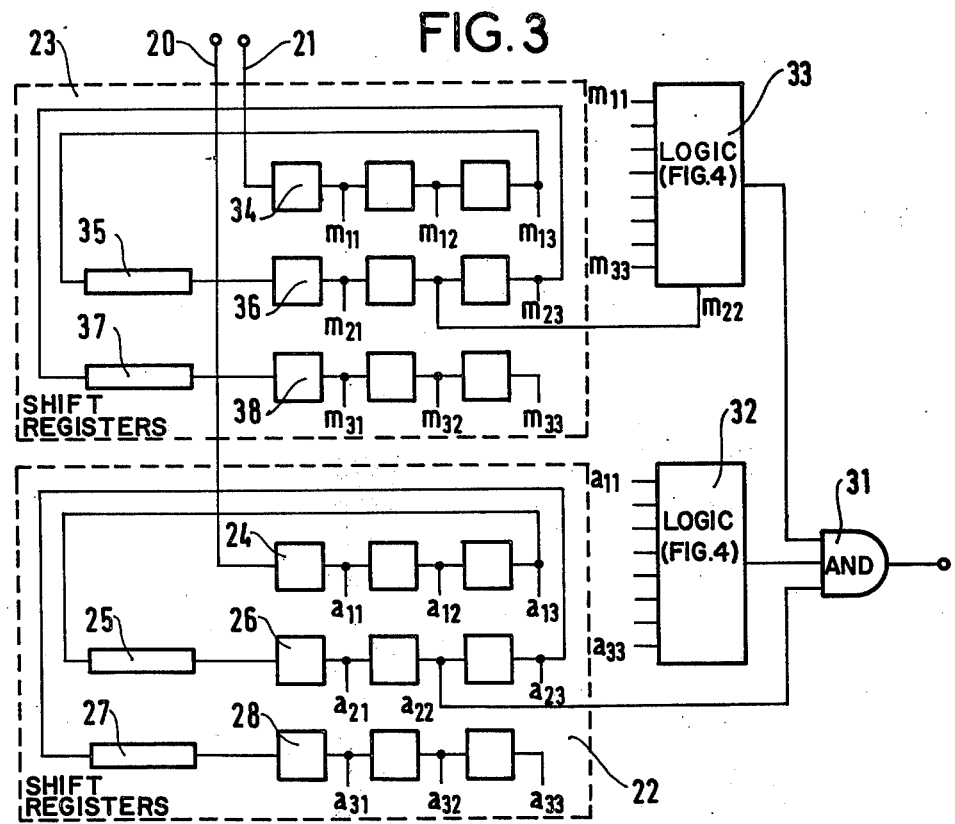

FACSIMILE TRANSMISSION INSTALLATION IN PARTICULAR FOR COPYING FORMS

FIELD OF THE INVENTION

The present invention relates to document reproduction installations which include transmitter equipment fitted with a document analysis assembly for delivering a facsimile signal by analyzing a document, a facsimile signal transmission line and reception equipment fitted with a reproduction assembly to restore the analyzed document from the transmitted facsimile signal.

The present invention relates more particularly to an installation of the above-mentioned type adapted to allow rapid transmission of the contents of documents such as order or reservation vouchers or forms, invoices, cheques, receipts, stock inventory sheets, etc.

Generally, such documents will be referred to hereinafter as forms.

The present invention aims to allow considerable time saving in the transmission of a facsimile signal between transmission and reception equipments for reproducing an analyzed form.

SUMMARY OF THE INVENTION

The present invention provides a facsimile transmission installation which include a portion which is common to a plurality of transmissions and a portion which may vary from transmission to transmission, such documents being referred to as forms; the installation comprising a transmitter terminal including a document analyzer together with means for generating a facsimile signal therefrom, a receiver terminal including means for receiving the facsimile signal together with a document reproducer responsive thereto, and means for conveying the facsimile signal from the transmitter terminal to the receiver terminal wherein each terminal includes a memory for recording the portions of documents which are common to a plurality of transmissions, "blank forms" means for selecting a particular blank form from the memory; wherein the transmitter terminal includes a comparator connected to the memory and to the analyzer to receive relatively a memorized signal and an analysis signal therefrom and to generate in response thereto a useful signal representative of the difference between the completed form being analyzed and the memorized blank form, and a data compression coder connected to receive the useful signal and to generate said facsimile signal; and wherein the receiver terminal includes a decoder-expander to receive the facsimile signal and restore the useful signal therefrom, and a regenerator connected to said decoder-expander and to the receiver memory to receive respectively the useful signal and the memorized signal therefrom and to generate in response thereto a restored analysis signal which represents the contents of the completed form and to apply the restored analysis signal to the document reproducer.

BRIEF DESCRIPTION OF THE DRAWINGS

Other characteristics and the advantages of the present invention will become apparent from the description of embodiments given by way of example and illustrated in the accompanying drawings, in which:

FIG. 3 shows schematically an embodiment of a comparator which forms a part of FIG. 1;

FIG. 4 shows an embodiment of logic circuits which forms part of FIG. 3;

DESCRIPTION OF THE PREFERRED EMBODIMENTS

Figure 1:
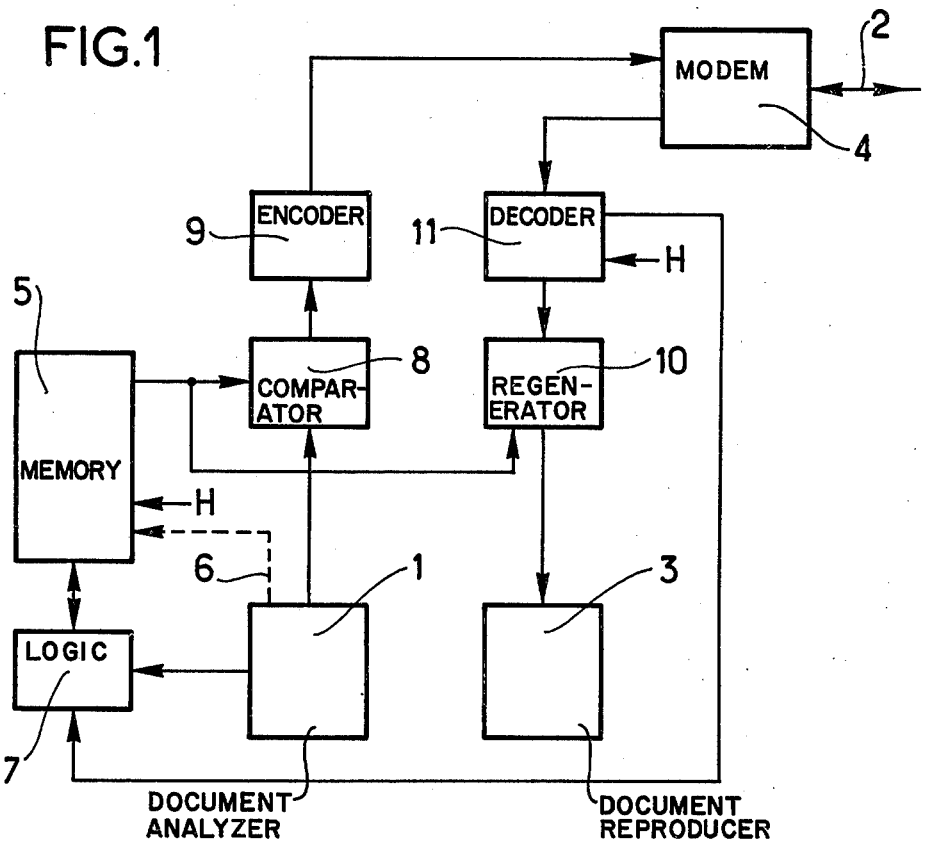
FIG. 1 shows schematically a transmission-reception terminal equipment in accordance with the invention.

In FIG. 1, a facsimile transmission installation in accordance with the invention is shown schematically by only one of a pair of terminal equipments which co-operate; one operating as a transmitter and the other as a receiver. The equipment shown is both-way equipment, i.e. it is of the transmitter-receiver type, the other equipment being identical to it.

As is known, transmitter-receiver equipment comprises principally a transmission channel and a reception channel. The transmission channel includes a document analyser 1 which generates an analysis signal in digital form by scanning the document with a reading head, in order to transmit a facsimile signal of the analyzed document over a transmission line 2 (a telephone line) to the remote equipment which then operates as a receiver. For example, a white point generates a 0 bit while a black point generates a 1 bit; of course half tones could be taken into account and delivered in the analysis signal in binary form. The reception channel includes a document reproducer 3 which reproduces a document being analyzed in a remote equipment operating as a transmitter. The reproduction is in response to a facsimile signal transmitted from the remote equipment and relies on the near document being scanned by a writing head.

Since the analyzer 1 and the reproducer 3 are known, they have simply been shown schematically by two blocks. It is evident that a single device which performs both the analysis and the reproduction functions by scanning a document with a reading or writing head could be substituted for the separate devices 1 and 3. The transmission channel and the reception channel are connected to the line 2 by a single modulator-demodulator circuit 4 which delivers the facsimile signal for transmission or receives the facsimile signal transmitted by the line 2.

The transmitter-receiver equipment of the installation in accordance with the invention also includes a binary memory 5 for recording the contents of the various types of blank forms which the equipment in question can transmit to a remote equipment or can receive therefrom. The various types of forms are loaded into the memory from the analyzer 1 which initially receives the existing forms in blank: this loading of the blank forms into the memory 5 is schematically shown by a dashed-line connection 6 between the memory 5 and the analyzer 1.

In order to recognize the forms recorded in the memory 5, each form is identified (for example as will be seen with reference to FIG. 2) as to type of document by means of a code for recognizing the various forms, and as to location of its contents by means of a code for bringing its contents into register. Forms of the same type will all be identified identically and the location of the contents of each of these forms will also be established in the same way. When the blank forms are recorded in the memory 5, the analyzer 1 detects these two codes: the analysis signal transmitted to the memory is preceded by a form-identification signal and by a contents locating or contents-registering signal, both of these signals being memorized together with the analysis signal.

When the contents of a completed form is to be transmitted by an installation in accordance with the invention, the analyzer 1 is connected to the memory 5 via a logic circuit 7 for selecting a form in the memory (a blank form) and for recognizing the contents-registering signal delivered by the analyzer 1, to bring the registering signal in the memory into coincidence with the registering signal delivered by the analyzer 1. To obtain this coincidence, once the form has been selected, the circuit 7 receives the stored contents registering signal from the memory 5; once coincidence has been obtained, or after a given delay, the circuit 7 causes the blank form selected in the memory to be read. The analyzer 1 is also connected to a first input of a digital comparator 8; the comparator 8 also has a second input on which it receives the blank form selected in the memory once this form has been selected and after coincidence of the contents registering signals (one from the memory, the other from the analyzer). The memory 5 delivers the blank form at a pulse rate designated by H. Advantageously, these pulses will be the same as the pulses determining the analysis rate as delivered by a clock of the analyzer. The comparator 8 then delivers a signal representative of the difference between the blank and the completed forms. This signal is called the useful signal and its significant bits (bits at level 1) represent the useful contents of the completed form. The result of the comparison is an image which only includes information which has been added to the form. At the output of the comparator 8, this useful signal is preceded by the form-identification signal and by the contents registering signal which are supplied to the comparator by the analyzer 1 on its own. A run length coder 9 is connected to the output of the comparator 8 and delivers an encoded version of the output signal from the comparator to the modulator-demodulater circuit 4 for line transmission. The line transmission of the encoded and modulated signal thus occupies a very short period of time, since the transmission time is essentially a function of the useful contents of the completed forms. Indeed, since the signal delivered by the comparator is composed of significant bits representing the information added to the form and separated by a much larger portion of the parts which are common to the completed form being analyzed and to the memorized blank form, the result after encoding is a signal in which the portions in particular representing these common parts are very greatly reduced by virtue of the type of coding used. Thus, the facsimile signal transmitted to the line contains the document-identification signal, the contents registering signal and a signal representing the information added to the analyzed form and located in the detected common parts.

When an analyzed document is to be reproduced in an installation in accordance with the invention, the facsimile signal, generated as described above, is received from the line 2 by the modulator-demodulator 4, with the reproducer 3 having its input connected to the output of a document contents regenerator 10. The modulator-demodulator 4 is itself connected in the reception channel to a decoder circuit 11 which receives the demodulated facsimile signal. The decoder circuit 11 is connected to the logic circuit 7 which is common to the transmission and to the reception channels. The circuit 7 thus receives the decoded identification signal which it transmits to the memory 5 in order to select the stored blank form which corresponds to the transmitted completed form. The circuit 7 then brings the decoded contents-registering signal into coincidence with the contents-registering signal in the memory, and once coincidence has been obtained or after a given delay, it causes the blank form selected in the memory to be read. The regenerator 10 has two inputs, one connected to the decoder 11 and the other to the memory 5. The decoder 11 and the memory 5 respectively deliver the decoded signal and the memorized signal at a common rate given by pulses (also designated H) which are advantageously at the rate of the document reproducing pulses supplied by a clock belonging to the reproducer 3. In operation, the decoder reproduces the bits representative of the information added to the completed and analyzed form (1 bits) and the bits representative of the parts common to the completed and the blank forms (0 bits) as detected by the comparator 8 of the transmission channel and appearing in the demodulated facsimile signal. The bits represented of the added information are then correctly positioned in the decoded signal with respect to the bits representative of the common parts whose lengths are reproduced.

The regenerator 10 superposes the contents of the blank form (the memorized form) and the added information which constitutes the only image contained in the demodulated and decoded facsimile signal (the other bits indicating identity with the memorized signal), and it is advantageously constituted by a simple logic OR gate. The analyzed document is then reproduced by the reproducer 3 which is of known type. The document-identification code and the contents-registering code may, if so desired, be reproduced on the reproduced document by the reproducer 3 with the corresponding signals being transmitted thereto from the regenerator 10.

Figure 2:
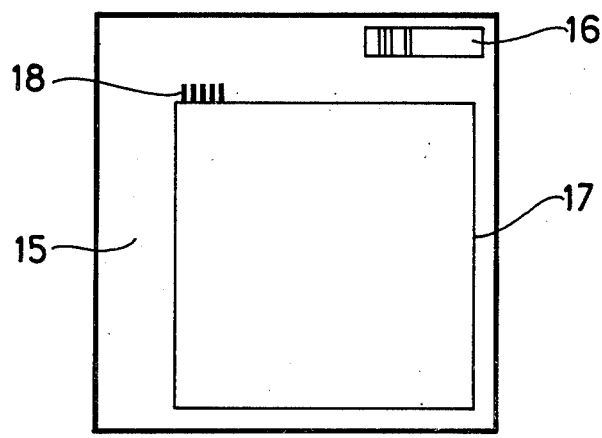
FIG. 2 shows a mode of identification of a form and a mode of locating its contents.

For a form 15, FIG. 2 shows one mode of form-identification and of contents-location. The form 15 may be blank or completed; all forms of the same type must be identified identically and their located contents must result in the same kind of data after reading.

As shown schematically at 16, the type of form is identified by coded data placed above the contents of the form. The location of the contents of the form is shown schematically in the figure by a rectangle 17. The identification data is, for example, constituted by a particular number in a series of identification numbers assigned respectively to various types of form. The identification data is coded in such a manner as to be easily read by the analyzer (here in the form of a bar code) and, to be easily reproduced by the reproducer. This coded identification data is either directly printed on to the form or else printed on to a label stuck on to the form. To print this coded data, a key-operated type of coder can be used to enable the data to be entered. After coding, the data is transmitted to a printer which is associated with the coder to print bars according to a configuration determined by the coding. The bars are preferably applied to the form in such a manner that they are perpendicular to a set of form scanning lines, thereby facilating reading by the analyzer.

The contents of the form are located by further coded data likewise applied to the form above the contents of the form, but below the form identification data. When read by the analyzer 1 during scanning of the form, this further data indicates the precise location of the beginning of the text on the form. This further data is provided in order to enable super-positioning, during analysis, of a blank form stored in the memory and the initial contents of the same completed form in particular by detecting the beginning of the text. This further data may be constituted by the rectangle or box such as 17, or simply by the top left-hand corner of the rectangle 17 which may be marked or printed in continuous or discontinuous lines at a short distance from the text of the form. The data for locating the beginning of the text can also be constituted by a mark in the form of a pre-determined series of bars such as 18. This series of bars is different from all coded identification data and is applied to the document to cover a given number of scanned lines to define the horizontal and vertical position of the beginning of the text on the form relative thereto, i.e. at a fixed distance therefrom. In this latter case, for example, the first bar of the series of bars defines the vertical alignment of the contents of the document while the complete series of bars which is separated from the text by a known number of scanned lines announces the beginning of the text in a precise manner and hence the beginning of the contents of the memorized form as well as the beginning of the contents of the analyzer form. The bringing of the locating data and the beginning of the contents of the memorized form into coincidence with the locating data at the beginning of the contents of the analyzed form indicates that the signal from the memory and the signal from the analyzer are in phase, i.e. are in exact correspondance regarding the stored or analyzed points of the common parts.

FIG. 3 shows a device for correcting possible errors in the analysis of a form, i.e. coming from the memorized signal or from the analysis signal of the completed form. This device is associated with the comparator referenced 8 in FIG. 1. In FIG. 3 the corrector-comparator device illustrated receives the signal delivered by the analyzer 1 of FIG. 1 on an input 20 and the signal delivered by the memory 5 of FIG. 1 on an input 21, these two signals for comparison coinciding as to the positions of points of the stored form and the form being analyzer. The signal resulting from the analysis of the completed form, as received at 20, is applied to the input of a set of shift registers 22 connected in series. The set of registers 20 is capable of isolating three groups, each of three consecutive analysis points, corresponding to three respective consecutive lines of the analysis of the completed form and in corresponding positions along each line. The capacity of the set 22 is thus at least equal to the number of bits delivered by two complete lines of analysis plus at least three more bits. The signal delivered by the memory and received at 21, is likewise applied to the input of a set 23 of shift registers connected in series and likewise capable of isolating three groups each of three consecutive analysis points, the groups corresponding respectively to three consecutive lines of analysis of the stored blank form and corresponding in position along each of the analysis lines in question of the blank form and of the completed form. The capacity of the set 23 is thus at least equal to the number of bits contained in two lines of analysis plus at least three more bits.

In the embodiment shown, the set 22 comprises three first registers such as 24 each capable of storing one bit, followed by a register 25 then three second registers such as 26 giving a total capacity equal to the number of bits per complete line of analysis. The three second registers such as 26 can each store one bit and they are followed by a register 27 and then three third registers such as 28. The total capacity of the register 27 with the third register 28 is also equal to the number of bits coming from a line of analysis; each register 28 being capable of storing a single bit. The three groups of analyzed points which are isolated at each instant by the set 22 are designated as $a_{11}$, $a_{12}$, $a_{13}$; $a_{21}$, $a_{22}$, $a_{23}$; and $a_{31}$, $a_{32}$, $a_{33}$.

A similar realization is provided for the set 23 which comprises three first registers such as 34, followed by a register 35 and three second registers such as 36, themselves followed by a register 37 and then three third registers such as 38. The three registers 34, 36 and 38 can each store one bit. The registers 35 and the three registers such as 36 have a total capacity equal to the number of bits per complete line of analysis. The same is true for the register 37 with the three registers such as 38. The three groups of points from the signal delivered by the memory which are thus isolated by the set 23 are designated by $m_{11}$, $m_{12}$, $m_{13}$; $m_{21}$, $m_{22}$, $m_{23}$; and $m_{31}$, $m_{32}$, $m_{33}$. The points m correspond to the points a indicated above.

The corrector-comparator device is completed by an AND gate 31 which performs the comparison function between the analysis signal and the memorized signal. The AND gate 31 receives the bit corresponding to the analysis point $a_{22}$ from the set 22 and the binary signals appearing at the outputs of first and second logic processing circuits 32 and 33. The logic circuit 32 is associated with the set 22 and is arranged to suppress (via the AND gate 31) any isolated black point of the analysis which would otherwise appear in the output signal of the gate 31. the circuit 32 receives on eight inputs the analysis points which are isolated by the set 22, with the exception of the point $a_{22}$. The logic circuit 33 is associated with the set 23 and is arranged to perform two functions. In association with the gate 31 it eliminates all black points existing in the stored form (a 1 bit in the memorized signal) from the signal delivered by the AND gate 31. Thus, in the signal delivered after comparison, i.e. at the output of the AND gate 31, a black point which is common to the memorized form ($m_{22}=1$) and to the analyzed form ($a_{22}=1$) is eliminated; further, a black point in the memorized form ($m_{22}=1$) corresponding to a white point in the analyzed form ($a_{22}=0$) is also eliminated. To perform this first function, the circuit 33 receives the bit from the memory point $m_{22}$.

Further, the circuit 33 eliminates any bit in the analysis signal which is significant of a black point ($a_{22}=1$) corresponding to a white point in the memorized signal ($m_{22}=0$) provided the white point in the memorized signal is adjacent to a line of black points in the memorized signal.

Therefore, in addition to the memorized point examined at $m_{22}$, it also receives the eight other memorized points corresponding to the points adjacent thereto on the blank form, these points being isolated by the set 23. In this second function, the circuit 33 interrupts any white point $m_{22}$ adjacent to a line as a black point.

A realization of these two logic circuits 32 and 33 associated with the AND gate 31 is shown in FIG. 4.

The circuit 32 is constituted by an eight-input logic OR gate receiving the bits $a_{11}$, $a_{12}$, $a_{13}$, $a_{21}$, $a_{23}$, $a_{31}$, $a_{32}$, and $a_{33}$. Its output is connected to one of the inputs of the AND gate 31 which receives $a_{22}$ on another input.

The circuit 33 includes a NOR gate 45 which receives the bit $m_{22}$ on a first input. It also includes four AND gates 46, 47, 48 and 49 each of which combine in threes the memorized points which correspond to a line or to a column adjacent to the memorized point $m_{22}$. Thus, the AND gate 46 receives the bits $m_{11}$, $m_{12}$ and $m_{13}$ on three inputs. The AND gate 47 receives the bits $m_{11}$, $m_{21}$ and $m_{31}$ on three inputs. The AND gate 48 receives the bits $m_{31}$, $m_{32}$, and $m_{33}$ on three inputs, and the AND gate 49 receives the bits $m_{13}$, $m_{23}$ and $m_{33}$.

The operation of the corrector-comparator circuit as shown in FIGS. 3 and 4 is explained with reference to diagrams A to E of FIG. 5. A shows the configuration of the memorized points m as isolated by the set 23. The configuration of the analyzed points a as isolated by the set 22 is identical. This configuration enables the successive memorized points appearing in the position $m_{22}$ to be examined. Any black points ($m_{22}=1$) will put the output of the NOR gate 45 to level 0 and will thus block the AND gate 31, thereby preventing any corresponding analysis point $a_{22}$ from appearing at the output of the AND gate 31 whatever the adjacent memorized points may be in the configuration A and regardless whether the analysis point $a_{22}$ is black or white. The case where $m_{22}=1$ and $a_{22}=0$ will produce a non-significant bit in the useful signal at the output of the AND gate 31; this case means that an analysis error has occurred in the memorized blank form signal or in the completed form analysis signal. This error is therefore removed.

Figure 5:
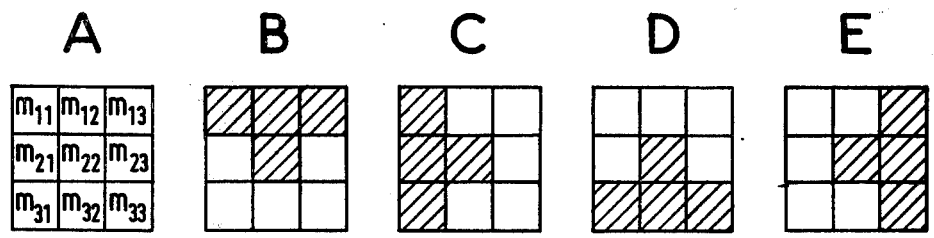
FIG. 5 explains the functions of the arrangement in FIG. 3 and of the circuits in FIG. 4.

In B, C, D and E of FIG. 5, the points are not referenced; they correspond to those shown in A. In B, the function of the AND gate 46 associated with the NOR gate 45 is shown schematically: these two gates make it possible to remove from the output signal from the AND gate 31 any analysis point ($a_{22}$) adjacent to a memorized horizontal line of which it may form a part, this line running through the three positions $m_{11}$, $m_{12}$ and $m_{13}$ of the configuration in question. C, D and E sketch the analogous functions performed by the AND gates 47, 48 and 49 each associated with the NOR gate 45 for the removal of a point ($a_{22}$) adjacent to one or other of the neighbouring vertical lines or to the other horizontal line. It is observed that if the output of one of the gates 46 to 49 is in the state 1 (a black line is detected by this gate), the output of the gate 45 is in the state 0 whatever $a_{22}$ or $m_{22}$ may be (black or white points). This arrangement therefore makes it possible also to take into account the little differences in analysis of the parts common to the blank form (memorized signal) and to the completed form (analysis signal) by removing a black point $a_{22}$ which is adjacent to any vertical or horizontal line of the memorized blank form. This arrangement (gates 45 to 49) therefore virtually thickens all lines on the blank form by an elementary point on each side of the line, so as to remove sampling differences on analysis.

Figure 6:
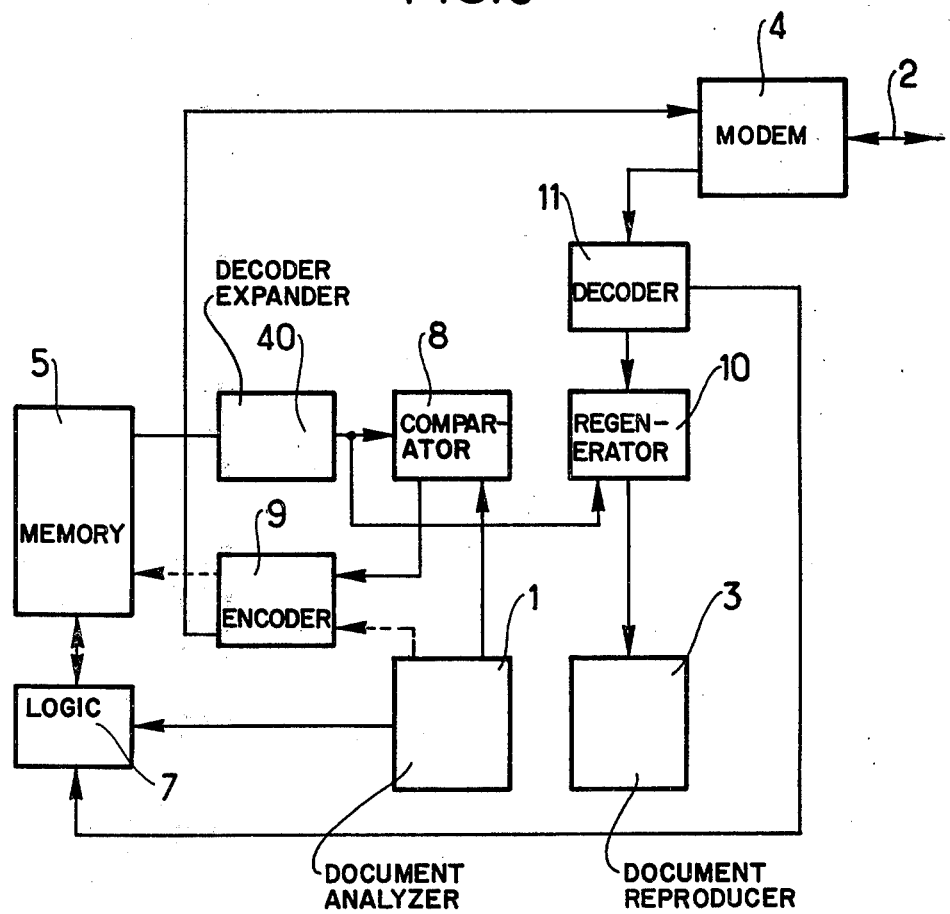
FIG. 6 shows schematically a variant of the device in FIG. 1.

FIG. 6 shows schematically a variant given with reference to FIG. 1, intended to allow a memorization of a large number of types of forms. In this FIG. 6, the circuits which are identical to those in FIG. 1 bear the same reference symbols. Only the differences between these two embodiments are described hereinbelow.

In the variants given in FIG. 6, each type of form is recorded in the memory 5 in a compressed form. For this purpose, the analyzer 1 is connected to the memory 5 (dashed-line connections) to record each form via the encoder which is here also referenced 9, which operates by run length coding. The comparator 8 receives firstly the digital analysis signal of the completed form delivered by the analyser 1 and secondly the memorized signal of the corresponding blank form, which is applied to it via a decoder-expander 40. Therefore, the analysis signal is compared with the memorized signal after the latter has been restored to its complete state by decoding in the decoder 40. This comparison signal is then coded in the coder 9 and transmitted on the line 2 via the modulator-demodulator 4.

Similarly, the regenerator 10 is connected firstly to the decoder 11 which restores the signal which results from the comparison made on the transmission channel of the remote equipment and secondly to the memory 5 via the decoder-expander 40.

By way of example, the capacity of the memory 5 for recording a document in A4 format with a horizontal definition of 1728 analysis points per line is about 2M bits for a vertical definition of 3.85 lines per millimeter and about 4 M bits for a vertical definition of 7.7 lines per millimeter. In contrast, if a mode of recording the forms in a compressed form is adopted, a compression ratio of about 5 can be obtained; this makes it possible to reduce the size of the memory in the same proportion to record a form or allows a greater number of forms to be recorded.

The installation described with a view to reproducing forms and transmitting only the useful contents of each form operates conventionally for transmitting any other non-memorized document.

Although the invention has been described with reference to particular embodiments shown in the drawings, it is possible without going beyond the scope of this invention to modify details and replace some means by other equivalent means therein. It will be observed in particular that one of the end equipments can simply be a transmitter while the other is a receiver. The memory of each equipment will be loaded from the analysis of blank forms; for this purpose, the receiver can therefore include an analyzer for loading its memory or it can simply receive the analysis signals of the blank form from the transmitter for loading into its memory.

What is claimed is:

1. A facsimile transmission installation for transmitting documents which include a portion which is common to a plurality of transmissions and a portion which may vary from transmission to transmission, such documents being referred to as forms; the installation comprising a transmitter terminal including a document analyzer together with means for generating a facsimile signal therefrom, a receiver terminal including means for receiving the facsimile signal together with a document reproducer responsive thereto, and means for conveying the facsimile signal from the transmitter terminal to the receiver terminal wherein each terminal includes a memory for recording the portions of documents which are common to a plurality of transmissions, the recorded portions of documents being referred to as "blank forms", means for selecting a particular blank form from the memory; wherein the transmitter terminal includes a comparator connected to the memory and to the analyzer to receive respectively a memorized signal and an analysis signal therefrom and to generate in response thereto a useful signal representative of the difference between the completed form being analyzed and the memorized blank form, and a date compression encoder connected to receive the useful signal and to generate said facsimile signal; and wherein the receiver terminal includes a decoder-expander to receive the facsimile signal and to restore the useful signal therefrom, and a generator connected to said decoder-expander and to the receiver memory and to receive respectively the useful and the memorized signal therefrom and to generate in response thereto a restored analysis signal which represents the contents of the completed form and to apply the restored analysis signal to the document reproducer.

2. An installation according to claim 1, wherein said comparator comprises a first logic error corrector circuit which receives firstly from the analysis signal a bit which corresponds to an examined analysis point, and secondly from the memory the bits which correspond to the memorized adjacent points, to remove all significant bits in said useful signal when an isolated analysis black point is detected.

3. An installation according to claim 1 or 2, wherein said comparator comprises a second logic error corrector circuit which receives from the memorized signal the bit of an examined point and which removes all significant bits in the useful signal when a black point of the memorized form is detected.

4. An installation according to claim 3, wherein said comparator comprises a third logic error correction circuit associated with said second logic circuit and which receives from the memorized signal firstly the bit of an examined point and secondly the bits of the points which are adjacent to the examined point and which removes all significant bits in said useful signal when an examined point is detected adjacent to a line defined by three adjacent memorized points, whether aligned in a line or in a column.

5. An installation according to claim 2, wherein said first logic circuit is associated with a first input circuit constituted by a set of shift registers which receives said analysis signal and has an overall capacity equal to the total number of bits which come from two complete analysis lines of the completed form to which are added at least three bits, which makes it possible to isolate the bit which corresponds to an examined point of the completed form and the bits which correspond to the respectively neighbouring point which belong to the same analysis line of the completed form.

6. An installation according to claim 4, wherein said third logic circuit is associated with a second input circuit constituted by a set of shift registers which receives said memorized signal and has an overall capacity equal to the total number of bits which come from two complete analysis lines of the blank form to which are added at least three bits, which makes it possible to isolate the bit which corresponds to an examined point of the blank form and the bits which corresponds to an examined point of the blank form and the bits which correspond to the respective neighbouring points which belong to the same analysis line, the preceding analysis line and the following analysis line of the blank form.

7. An installation according to claim 1, wherein the circuit for selecting each of the types of forms is constituted by a circuit for detecting identification data assigned respectively to each type of form and contents registering data of each form.

* * * * *